(12) United States Patent
Torrico-Bascopé et al.

(10) Patent No.: US 10,715,050 B2
(45) Date of Patent: Jul. 14, 2020

(54) FOUR-SWITCH THREE PHASE DC-DC RESONANT CONVERTER

(71) Applicant: Huawei Technologies Co., Ltd., Shenzhen (CN)

(72) Inventors: Grover Victor Torrico-Bascopé, Kista (SE); Cicero Da Silveira Postiglione, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/913,990

(22) Filed: Mar. 7, 2018

(65) Prior Publication Data

US 2018/0198373 A1    Jul. 12, 2018

Related U.S. Application Data

(63) Continuation of application No. PCT/EP2016/066083, filed on Jul. 7, 2016.

(51) Int. Cl.
| | | |
|---|---|---|
| *H02M 3/335* | (2006.01) | |
| *H02M 1/08* | (2006.01) | |
| *H02M 3/28* | (2006.01) | |
| *H02M 3/337* | (2006.01) | |
| *H02M 1/00* | (2006.01) | |

(52) U.S. Cl.
CPC ....... *H02M 3/33584* (2013.01); *H02M 1/083* (2013.01); *H02M 3/285* (2013.01); *H02M 3/337* (2013.01); *H02M 3/33592* (2013.01); *H02M 2001/0058* (2013.01); *Y02B 70/1433* (2013.01);

(Continued)

(58) Field of Classification Search
CPC ..................... H02M 3/285; H02M 2001/0058
See application file for complete search history.

(56) References Cited

U.S. PATENT DOCUMENTS

| | | | | |
|---|---|---|---|---|
| 5,907,481 A | * | 5/1999 | Svardsjo | ........... H02M 3/33592 363/25 |
| 6,064,580 A | * | 5/2000 | Watanabe | ......... H02M 3/33592 363/127 |

(Continued)

FOREIGN PATENT DOCUMENTS

| | | |
|---|---|---|
| CN | 1960157 A | 5/2007 |
| CN | 101841244 A | 9/2010 |

(Continued)

OTHER PUBLICATIONS

Engel et al., "Dynamic and Balanced Control of Three-Phase High-Power Dual-Active Bridge DC-DC Converters in DC-Grid Applications," IEEE Transactions on Power Electronics, vol. 28, No. 4, pp. 1880-1889, Institute of Electrical and Electronics Engineers, New York, New York (Apr. 2013).

(Continued)

*Primary Examiner* — Yusef A Ahmed
(74) *Attorney, Agent, or Firm* — Leydig Voit & Mayer, Ltd.

(57) ABSTRACT

A switching circuit includes a first half-bridge circuit, a second half-bridge circuit and a voltage divider circuit connected in parallel with each other and a DC input power ($V_{DC}$). The first half-bridge circuit includes a first pair of series connected switches and the second half-bridge circuit includes a second pair of series connected switches.

15 Claims, 5 Drawing Sheets

(52) U.S. Cl.
CPC ....... *Y02B 70/1475* (2013.01); *Y02B 70/1491* (2013.01); *Y02P 80/112* (2015.11)

(56) References Cited

U.S. PATENT DOCUMENTS

| | | | | |
|---|---|---|---|---|
| 6,069,798 | A * | 5/2000 | Liu | H02M 3/33569 363/134 |
| 6,091,610 | A * | 7/2000 | Garcia | H02M 3/3376 363/17 |
| 6,370,050 | B1 * | 4/2002 | Peng | H02M 3/33576 363/17 |
| 7,518,886 | B1 * | 4/2009 | Lai | H02P 8/12 363/17 |
| 9,240,723 | B2 * | 1/2016 | Boysen | H02M 3/3376 |
| 9,537,388 | B2 * | 1/2017 | Haj-Maharsi | H02M 1/4216 |
| 2009/0196082 | A1 * | 8/2009 | Mazumder | H02M 5/458 363/132 |
| 2011/0051842 | A1 * | 3/2011 | van der Heijden | H03F 1/0294 375/295 |
| 2012/0153729 | A1 * | 6/2012 | Song | H02J 7/0013 307/82 |
| 2012/0163035 | A1 * | 6/2012 | Song | H02M 3/33584 363/17 |
| 2012/0320638 | A1 * | 12/2012 | Boysen | H02M 3/3376 363/21.02 |
| 2013/0003424 | A1 * | 1/2013 | Song | H02M 3/33584 363/21.04 |
| 2013/0063981 | A1 * | 3/2013 | Dujic | H02M 1/4233 363/16 |
| 2013/0201725 | A1 * | 8/2013 | Boysen | H02M 3/3376 363/15 |
| 2014/0119060 | A1 * | 5/2014 | Zhu | H02M 1/10 363/17 |
| 2015/0146455 | A1 * | 5/2015 | Engel | H02M 3/33584 363/17 |
| 2015/0180350 | A1 * | 6/2015 | Huang | H02J 7/0068 307/66 |
| 2016/0254756 | A1 * | 9/2016 | Yang | H01F 30/12 363/21.02 |
| 2016/0301250 | A1 * | 10/2016 | Woronowicz | B60M 7/003 |
| 2017/0025963 | A1 * | 1/2017 | Otake | H02M 1/08 |
| 2017/0349054 | A1 * | 12/2017 | Yang | B60L 53/24 |
| 2018/0152112 | A1 * | 5/2018 | Torrico-Bascope | H02M 3/33584 |
| 2018/0198380 | A1 * | 7/2018 | Sterna | H02M 7/219 |
| 2019/0068060 | A1 * | 2/2019 | Kim | H02M 3/33523 |
| 2019/0173387 | A1 * | 6/2019 | Tanaka | H02M 1/08 |
| 2019/0355506 | A1 * | 11/2019 | Fei | H02M 3/1584 |
| 2019/0379291 | A1 * | 12/2019 | Xue | H02M 7/219 |
| 2019/0379292 | A1 * | 12/2019 | Fei | H01F 30/12 |
| 2019/0386571 | A1 * | 12/2019 | Dincan | H02M 3/33569 |
| 2020/0007030 | A1 * | 1/2020 | De Doncker | H02M 3/3376 |
| 2020/0044572 | A1 * | 2/2020 | Bouchez | H02M 1/083 |

FOREIGN PATENT DOCUMENTS

| | | |
|---|---|---|
| CN | 102130611 A | 7/2011 |
| CN | 102812628 A | 12/2012 |
| CN | 103138583 A | 6/2013 |
| CN | 105490275 A | 4/2016 |
| CN | 105490604 A | 4/2016 |
| EP | 2887523 A1 | 6/2015 |
| JP | 2005245089 A | 9/2005 |
| JP | 2006254632 A | 9/2006 |
| JP | 2016001980 A | 1/2016 |
| WO | 2013135811 A2 | 9/2013 |

OTHER PUBLICATIONS

Almardy et al., "Three-Phase (LC)(L)-Type Series-Resonant Converter With Capacitive Output Filter," IEEE Transactions on Power Electronics, vol. 26, No. 4, pp. 1172-1183, Institute of Electrical and Electronics Engineers, New York, New York (Apr. 2011).

* cited by examiner

FOUR-SWITCH THREE PHASE DC-DC RESONANT CONVERTER

CROSS-REFERENCE TO RELATED APPLICATIONS

This application is a continuation of International Application No. PCT/EP2016/066083, filed on Jul. 7, 2016, the disclosure of which is hereby incorporated by reference in its entirety.

TECHNICAL FIELD

The embodiments of the present disclosure relate generally to power conversion apparatus and more particularly to resonant DC to DC power converters.

BACKGROUND

Resonant DC to DC converters are considered to be attractive power conversion solutions for the many benefits they can provide. Following a resonant tank with transformers provides galvanic isolation which is important for level conversion as well as for safety. In certain applications, galvanic isolation is required for proper operation. Resonant converters also have inherent properties, such as soft switching of the semiconductor switches, which lead to high efficiency and low noise.

The developing trends of the isolated direct current-direct current (DC-DC) converters are for very high efficient, high power density and low cost. The resonant DC-DC converters are suitable technology to achieve high efficiency in power converters due to the intrinsic capability to achieve soft switching (i.e. zero voltage switching (ZVS) and zero current switching (ZCS)). It is also possible to increase the switching frequencies in order to reduce the size of the reactive components of the system.

However, there are still drawbacks regarding the conventional three-phase resonant converter operating at high frequency (HF). In particular, the number of switches needed for high frequency operation increases the cost of the resonant converter. This is especially so if wide band gap semiconductors such as SiC and GaN are being used in the system.

Accordingly, it would be desirable to provide a DC-DC converter topology that addresses at least some of the problems identified above.

SUMMARY

The embodiments of the present application provide improved resonant DC to DC converter topologies that can deliver better efficiency and lower noise from smaller packages.

According to a first aspect of the present application the above and further objects and advantages are obtained by a switching circuit comprising a first half-bridge circuit, a second half-bridge circuit and a voltage divider circuit connected in parallel with each other and a DC input power, wherein the first half-bridge circuit comprises a first pair of series connected switches and the second half-bridge circuit comprises a second pair of series connected switches. The aspects of the disclosed embodiments provide a topological circuit for a three-phase DC-DC converter with a reduced number of switches. The input to output voltage gain is reduced which also reduces the stress across the transformer circuit and resonant tank circuit. High efficiency, high power density and low cost are realized.

In a first possible implementation form of the switching circuit according to the first aspect the first half bridge circuit, the second half bridge circuit and the voltage divider circuit produce a three-phase AC input power at an output of the switching circuit. The aspects of the disclosed embodiments produce a three-phase power using a reduced the number of switches in the inverter bridge cell, which increases reliability.

In a second possible implementation form of the switching circuit according to the first aspect as such or according to the first possible implementation form of the first aspect a switching pattern of each of the first half-bridge and the second half-bridge is phase shifted. Phase shifting each half-bridge leg allows the system to operate as a three-phase system.

In a third possible implementation form of the switching circuit according to the first aspect as such or according to any one of the preceding possible implementation forms, the phase shift is 60 degrees. Phase shifting each half-bridge leg allows the system to operate as a three-phase system.

In a fourth possible implementation form of the switching circuit according to the first aspect as such or according to the third possible implementation form the phase shift is in the range of 50 to 70 degrees. Phase shifting each half-bridge leg allows the system to operate as a three-phase system.

In a fifth possible implementation form of the switching circuit according to the first aspect as such or according to any one of the preceding possible implementation forms a first node is configured to be connected a first DC voltage terminal of the DC input power, and a second node is configured to be connected to a second DC voltage terminal of the DC input power, the first node connecting the DC input power to a first side of the first half bridge circuit, the second half bridge circuit and the voltage divider circuit, the second node connecting the DC input power to a second side of the first half bridge circuit, the second half bridge circuit and the voltage divider circuit. The aspects of the disclosed embodiments produce a three-phase power from a DC voltage input using a reduced the number of switches in the inverter bridge cell.

In a sixth possible implementation form of the switching circuit according to the first aspect as such or according to any one of the preceding possible implementation forms the first half-bridge circuit comprises a first switch connected in series with a second switch, wherein a first terminal of the first switch is connected to the first node connected to the first DC voltage terminal, a first terminal of the second switch is connected to the second node connected to the second DC voltage terminal and a second terminal of the first switch is connected is connected to a second terminal of the second switch. The aspects of the disclosed embodiments reduce the number of switches needed to produce a three-phase power output.

In a seventh possible implementation form of the switching circuit according to the first aspect as such or according to any one of the preceding possible implementation forms the second half-bridge circuit comprises a third switch connected in series with a fourth switch, wherein a first terminal of the third switch is connected to the first node connected to the first DC voltage terminal, a first terminal of the fourth switch is connected to the second node connected to the second DC voltage terminal and a second terminal of the third switch is connected to a second terminal of the fourth switch. The aspects of the disclosed embodiments reduce the number of switches needed to produce a three-phase power output.

In an eighth possible implementation form of the switching circuit according to the first aspect as such or according to any one of the sixth and seventh possible implementation forms the first switch and the second switch in the first half-bridge circuit, and the third switch and the fourth switch in the second half-bridge circuit comprise gallium-nitride (GaN) transistors. The aspects of the disclosed embodiment provide for the use of wide band-gap semiconductors to achieve high efficiency and high power density as well as lower cost.

In a ninth possible implementation form of the switching circuit according to the first aspect as such or according to any one of the preceding possible implementation forms the voltage divider circuit is a first capacitor connected in series with a second capacitor. The aspects of the disclosed embodiments use passive components to replace an active half-bridge cell, which increases reliability by reducing the number of active switches.

In a tenth possible implementation form of the switching circuit according to the first aspect as such or according to any one of the preceding possible implementation forms a first terminal of the first capacitor is configured to be connected to the first node connected to the first DC voltage terminal, a first terminal of the second capacitor is configured to be connected to the second node connected to the second DC voltage terminal, and a second terminal of the first capacitor is configured to be connected to a second terminal of the second capacitor. The aspects of the disclosed embodiments use passive components to replace an active half-bridge cell, which increases reliability by reducing the number of active switches.

In an eleventh possible implementation form of the switching circuit according to the first aspect as such or according to any one of the preceding possible implementation forms a first output node of the first half-bridge circuit is configured to provide a first power signal, a second output node of the second half-bridge circuit is configured to provide a second power signal and a third output node of the voltage divider circuit is configured to provide a third power signal, the first power signal, the second power signal and the third power signal comprising the three-phase AC input power. The aspects of the disclosed embodiments provide a switching circuit for producing a three-phase AC power signal with a reduced number of switches in the inverter bridge cell.

In an twelfth possible implementation form of the switching circuit according to the first aspect as such or according to the eleventh possible implementation form the first output node is connected between the first switch and the second switch, the second output node is connected between the third switch and the fourth switch and the third output node is connected between the first capacitor and the second capacitor. The aspects of the disclosed embodiments provide a switching circuit for producing a three-phase AC power signal with a reduced number of switches in the inverter bridge cell.

In an thirteenth possible implementation form of the switching circuit according to the first aspect as such or according to any one of the eleventh and twelfth possible implementation forms the first output node is configured to be connected to a first input phase of a resonant tank circuit to provide the first power signal; the second output node is configured to be connected to a second input phase of the resonant tank circuit to providing the second power signal; and the third output node is configured to be connected to a third input phase of the resonant tank circuit to provide the third power signal. This implementation form allows the resonant circuit to be driven from a DC power source with a lower cost, more reliable and efficient circuit topology.

According to a second aspect of the present application, the above and further object and advantages are obtained by a resonant converter system including a DC voltage input circuit, a switching circuit according to any one of the preceding possible implementation forms connected to the terminals of the DC input circuit, a resonant converter circuit connected to an output of the switching circuit, and a DC voltage output circuit. The aspects of the disclosed embodiment provide a resonant converter system that provides a simplified and more efficient layout of the converter due to the reduction of the number of switches in the inverter bridge cell.

In a first possible implementation form of the resonant converter system according to the second aspect as such, the resonant converter circuit is a three-phase resonant converter circuit, a first phase being provided by a first output of the switching circuit to the resonant converter circuit; a second phase being provided by a second output of the switching circuit to the resonant converter circuit; and a third phase being provided by the third output of the switching circuit to the resonant converter circuit. The aspects of the disclosed embodiments provide a simplified and more efficient layout of the three-phase resonant converter circuit due to the reduction of the number of switches in the inverter bridge cell.

In a second possible implementation form of the resonant converter system according to the second aspect as such or according to the first possible implementation form of the second aspect the resonant converter circuit comprises a resonant tank circuit, and wherein the first output of the switching circuit is connected to a first branch of the resonant tank circuit; the second output of the switching circuit is connected to a second branch of the resonant tank circuit; and the third output of the switching circuit is connected to a third branch of the resonant tank circuit. This implementation form allows the resonant circuit to be driven from a DC power source with a lower cost, more reliable and efficient circuit topology.

In a third possible implementation form of the resonant converter system according to the second aspect as such or according to any one of the first and second possible implementations forms of the second aspect the first output node of the switching circuit is configured to be connected to a first terminal of an inductance of the first branch of the resonant tank circuit; the second output node of the switching circuit is configured to be connected to a first terminal of an inductance of the second branch of the resonant tank circuit; and the third output node of the switching circuit is configured to be connected to a first terminal of an inductance of the third branch of the resonant tank circuit. The switching circuit of the disclosed embodiments can be applied to any three-phase topological circuits.

In a fourth possible implementation form of the resonant converter system according to the second aspect as such or according to any one of the first and second possible implementations forms of the second aspect the first output node of the switching circuit is configured to be connected to a first terminal of a capacitance of the first branch of the resonant tank circuit; the second output node of the switching circuit is configured to be connected to a first terminal of a capacitance of the second branch of the resonant tank circuit; and the third output node of the switching circuit is configured to be connected to a first terminal of a capacitance of the third branch of the resonant tank circuit. The switching circuit of the disclosed embodiments can be applied to any three-phase topological circuits.

In a fifth possible implementation form of the resonant converter system according to the second aspect as such or according to any one of the first through fourth possible implementation forms of the second aspect, the resonant converter circuit comprises a transformer circuit connected to an output of the resonant tank circuit. The aspects of the disclosed embodiments provide a three-phase four switch resonant converter that can be implemented with any type of connection to a galvanic isolation transformer.

In a sixth possible implementation form of the resonant converter system according to the second aspect as such or according to the fifth possible implementation form of the second aspect the DC voltage output circuit is connected to an output of the transformer circuit and comprises a three-phase rectifying bridge cell and an output filter. The aspects of the disclosed embodiments provide a high efficiency, high power density low cost DC-DC converter in any application that requires galvanic isolation and independence of the voltage value in the output of the system.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosed application, for which reference should be made to the appended claims. Additional aspects and advantages of the application will be set forth in the description that follows, and in part will be obvious from the description, or may be learned by practice of the application. Moreover, the aspects and advantages of the application may be realized and obtained by means of the instrumentalities and combinations particularly pointed out in the appended claims.

BRIEF DESCRIPTION OF THE DRAWINGS

In the following detailed portion of the present disclosure, the application will be explained in more detail with reference to the example embodiments shown in the drawings, in which:

FIG. 6 illustrates a graph showing voltage gain characteristics for a resonant circuit incorporating aspects of the disclosed embodiments.

FIG. 7 illustrates a graph showing exemplary switch control signals for a resonant circuit incorporating aspects of the disclosed embodiments.

DETAILED DESCRIPTION OF THE DISCLOSED EMBODIMENTS

Figure 1:
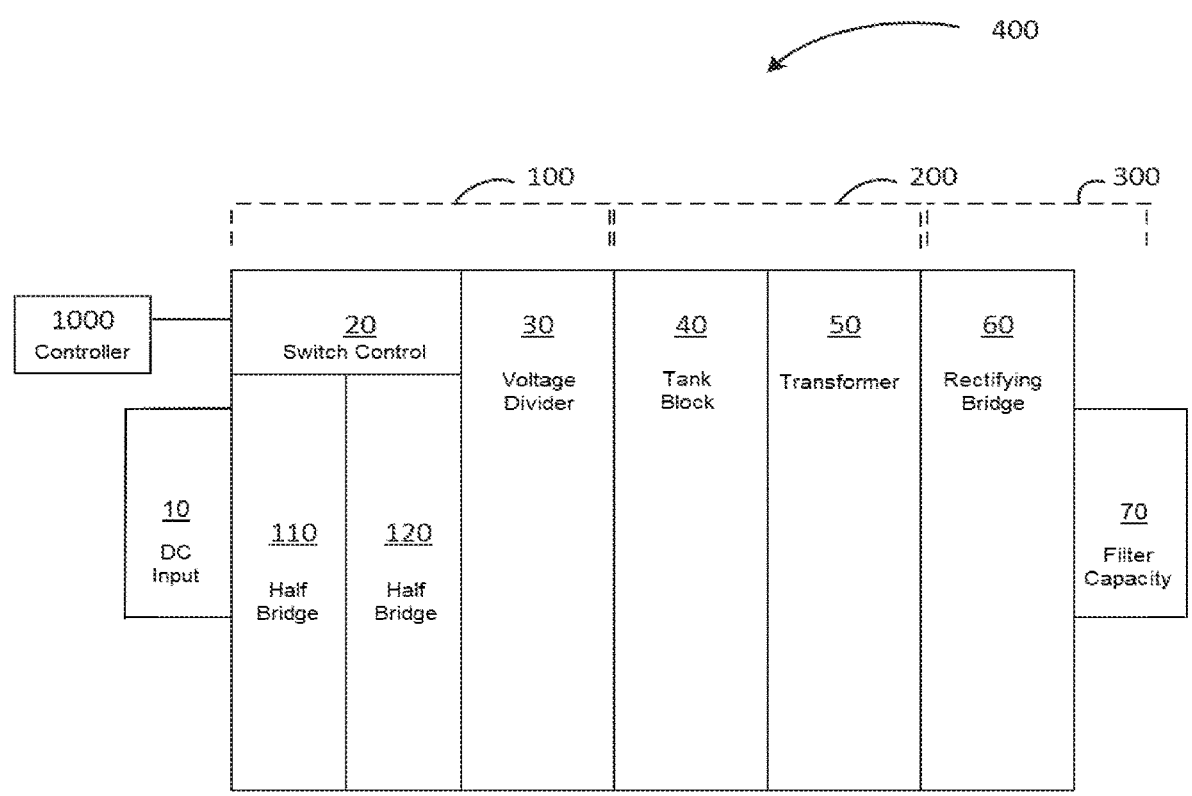
FIG. 1 is a block diagram illustrating an exemplary three phase DC-DC resonant converter system incorporating aspects of the disclosed embodiments.

Referring to FIG. 1, there can be seen an exemplary block diagram of a DC-DC three phase resonant converter system 400 incorporating aspects of the disclosed embodiments. As shown in FIG. 1, the three phase resonant converter system 400 generally includes a input circuit 10, generally referred to as a DC voltage input circuit 10, a switching circuit 100, a resonant converter circuit 200 and an output circuit 300, generally referred to as a DC voltage output circuit 300. The aspects of the disclosed embodiments are directed to a topological circuit of a three-phase DC-DC resonant converter system (400) that includes only four high frequency (HF) switches in the switching circuit 100. By reducing the number of switches, the input to output voltage gain is reduced and the voltage stress across the transformer circuits and resonant tank circuits is also reduced. As will be described in more detail below, the aspects of the disclosed embodiment provide for high variation of the input and output voltage, narrow frequency variation for voltage regulation, high efficiency, high power density and low cost. Although the aspects of the disclosed embodiment are described herein with respect to a three phase DC-DC resonant converter system, the aspects of the disclosed embodiments are suitable for any application that requires galvanic isolation and independence of the voltage value in the output of the system.

The three-phase DC-DC converter 400 of the disclosed embodiments is generally configured to receive a DC input power from the input circuit 10 and produce a three phase AC power signal. The switching circuit 100, also referred to as an inverter bridge cell, is configured to produce the three phase AC power signal.

Figure 2:
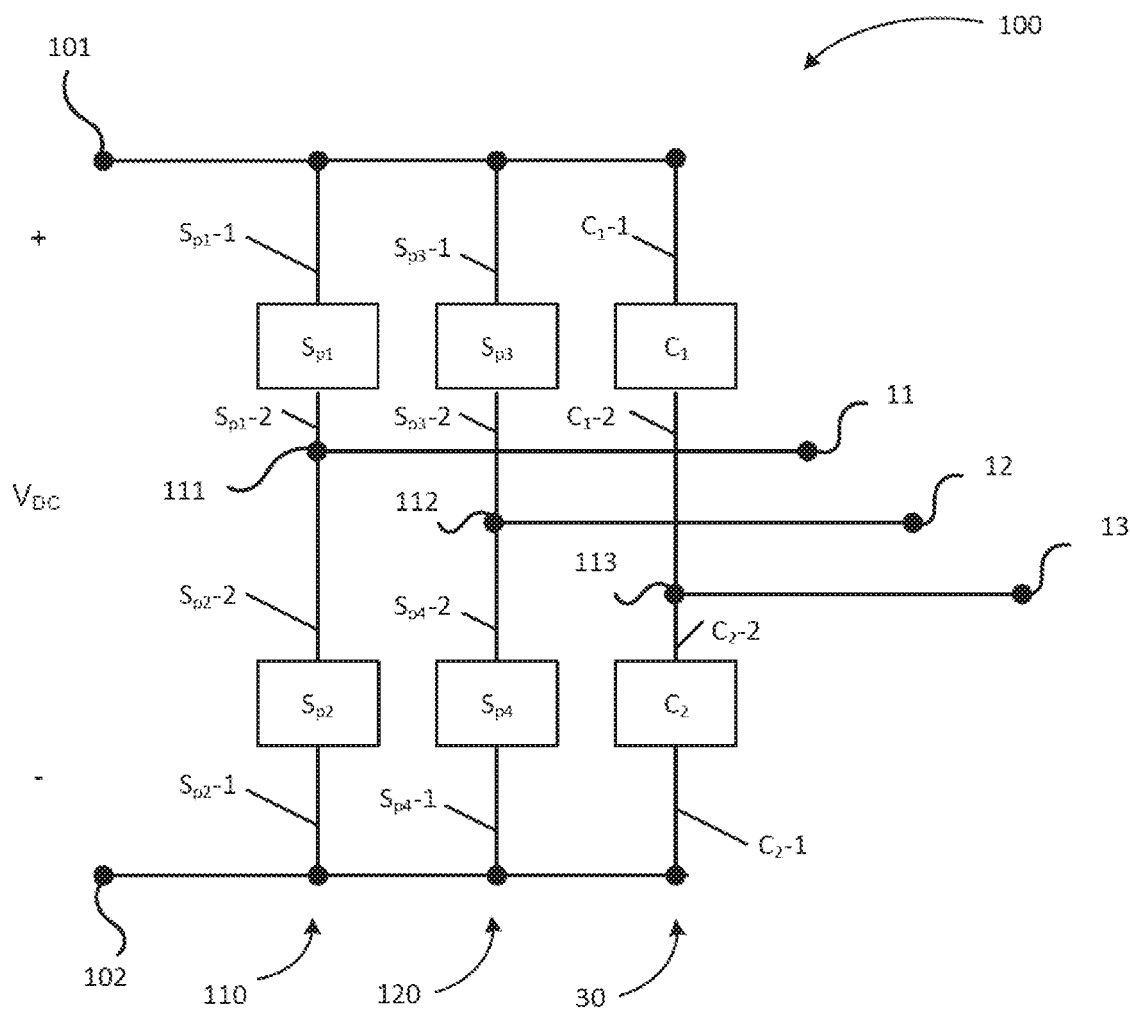
FIG. 2 illustrates a schematic diagram of an exemplary switching circuit incorporating aspects of the disclosed embodiments.

FIG. 2 is a schematic block diagram illustrating one embodiment of the switching circuit 100. Unlike a typical inverter bridge cell of a DC-DC resonant converter, the switching circuit 100 of the disclosed embodiments uses a reduced number of switches in the circuit. By reducing the number of switches, the number of active components in the circuit is reduced and reliability is increased. The reduced number of switches also lowers the cost and provides a more simplified and efficient layout of the converter 400.

Referring to FIG. 2, in this example the switching circuit 100 is a three-phase HF inverter bridge cell that includes a first half-bridge circuit 110, a second half-bridge circuit 120 and a voltage divider circuit 30. The first half-bridge circuit 110, the second half-bridge circuit 120 and the voltage divider circuit 30 are connected in parallel with each other and a DC input power $V_{DC}$. The DC input power $V_{DC}$ is received across positive (+) and negative (−) input rails, referred to herein as first node 101 and second node 102. The switching circuit 100 is configured to produce a three phase AC power at the three output nodes 111, 112 and 113.

In the example of FIG. 2, the first half-bridge circuit 110 includes a first pair of series connected switches $S_{p1}$, $S_{p2}$. The second half-bridge circuit 120 includes a second pair of series connected switches $S_{p3}$, $S_{p4}$. The switching circuit 100 includes four switches. In a typical three-phase converter, the number of switches used is twelve, six in the inverter cell and six in the rectification bridge cell. The aspects of the disclosed embodiments reduce the number of switches used in the switching circuit 100 or inverter cell, to four. Reducing the number of switches provides a more simplified and efficient layout for the converter system 400, while achieving high efficiency, high power density and low cost.

Figure 4:
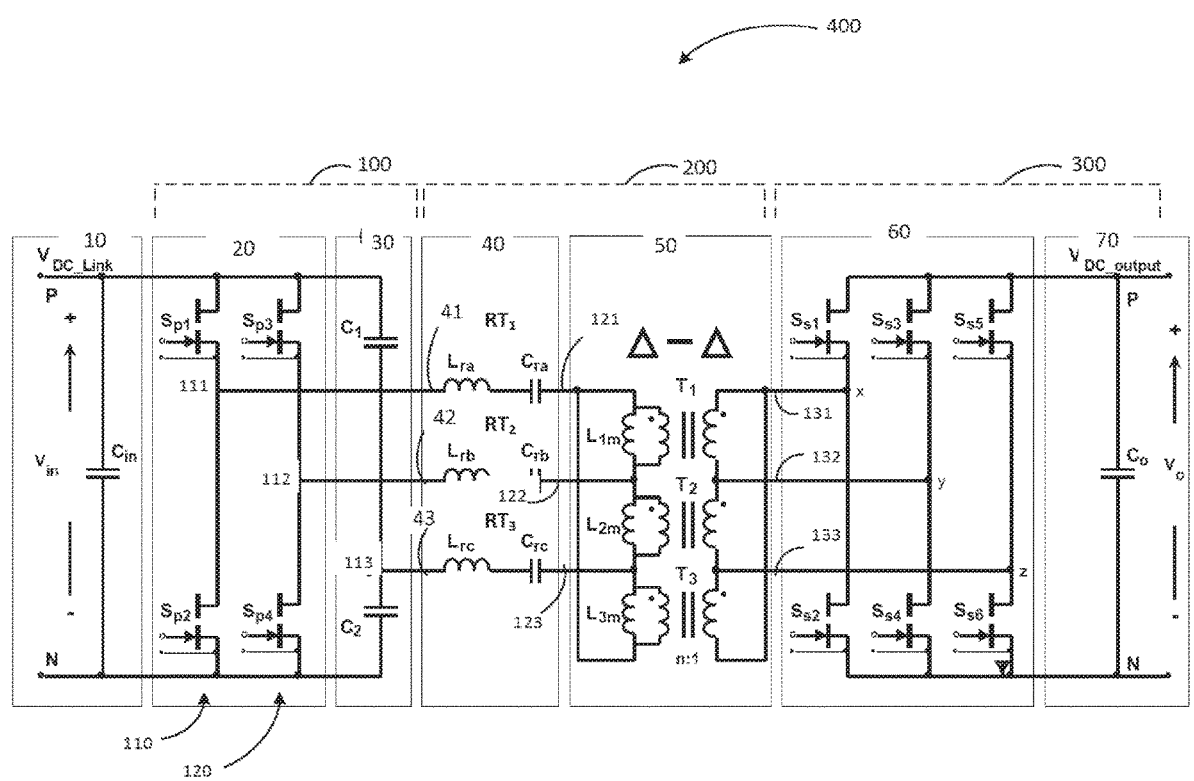
FIG. 4 illustrates a schematic diagram of delta-delta transformer connection for an exemplary three-phase DC-DC resonant converter system incorporating aspects of the disclosed embodiments.
Figure 5:
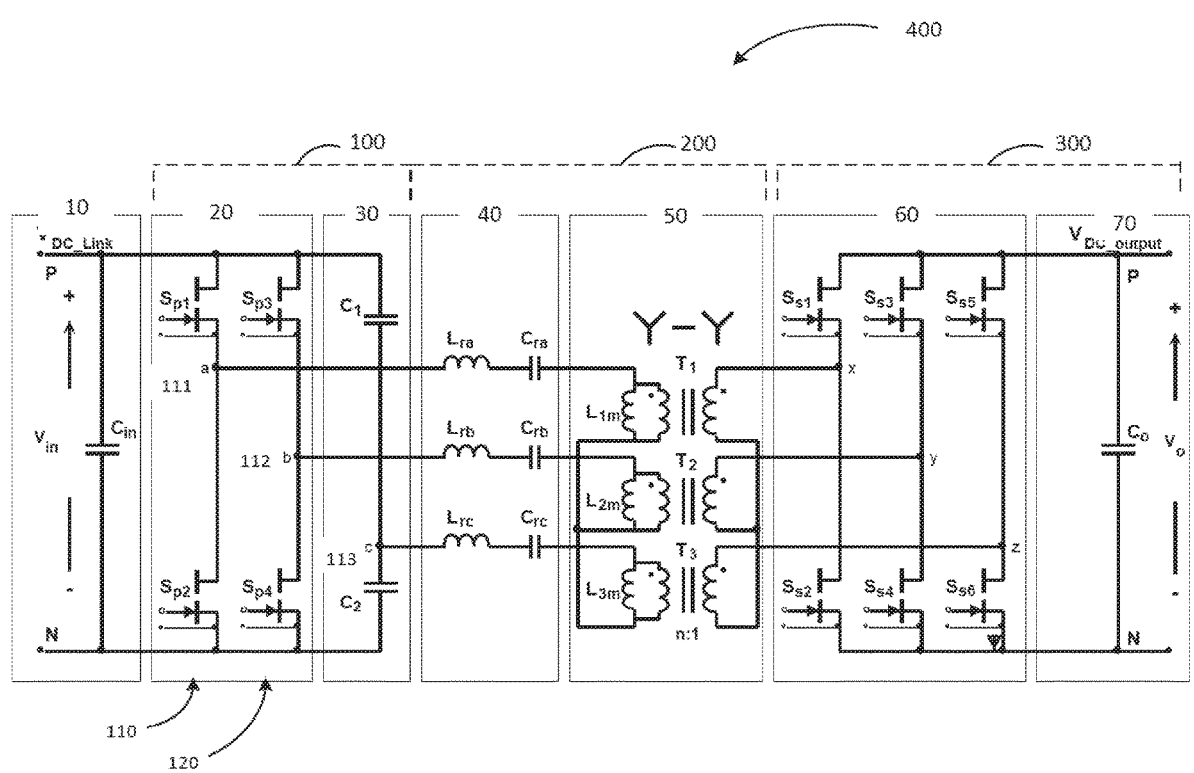
FIG. 5 illustrates a schematic diagram of wye-wye transformer connection for an exemplary three-phase DC-DC resonant converter system incorporating aspects of the disclosed embodiments.

The switches $S_{p1}$, $S_{p2}$, $S_{p3}$, $S_{p4}$ can generally comprise any suitable type of switching device or transistor. Examples include MOSFETs, IGBTs, GaN-HEMTs and MCTs devices constructed from a variety of materials including silicon (Si), silicon-carbide (SiC), gallium nitride (GaN), as well as other semiconductor materials, or combinations thereof. FIGS. 4 and 5 illustrate examples of the use of GaN for switches $S_{p1}$, $S_{p2}$, $S_{p3}$, $S_{p4}$.

Each switch $S_{p1}$, $S_{p2}$, $S_{p3}$, $S_{p4}$ is configured to be operated, i.e. turned on or off, by a switch control signal to produce the three-phase power suitable to drive the resonant converter circuit 200. In one embodiment, the switch control signal can be provided by a controller, such as the controller 1000 shown in FIG. 1. FIG. 7 illustrates an exemplary pattern 500 for the switch control signals for each of switch $S_{p1}$, $S_{p2}$, $S_{p3}$, and $S_{p4}$. In one embodiment, the switch control signals of the switching pattern 500 are phase shifted. In an exemplary embodiment, the phase shift θ is approximately 60 degrees. In alternate embodiments, the phase shift θ is in the range of approximately 50 degrees to and including 70 degrees. Applying the switch control signals to the switches $S_{p1}$, $S_{p2}$, $S_{p3}$, $S_{p4}$ will generate a phase for two of the three phases of the three phase AC power at the output nodes 111, 112.

In the example of FIG. 2, the first switch Sp1 has a first terminal $S_{p1}$-1 and a second terminal $S_{p1}$-2. The second switch Sp2 has a first terminal $S_{p2}$-1 and a second terminal $S_{p2}$-2. Similarly, third switch Sp3 has first terminal $S_{p3}$-1 and second terminal $S_{p3}$-2, while fourth switch Sp4 has first terminal $S_{p4}$-1 and second terminal $S_{p4}$-2. The first terminal $S_{p1}$-1 of the first switch Sp1 is connected to the first node 101, which is connected in this example to the positive DC voltage terminal P. The first terminal $S_{p2}$-1 of the second switch Sp2 is connected to the second node 102, which in this example is connected to the negative DC voltage terminal N. The second terminal $S_{p1}$-2 of the first switch Sp1 and the second terminal $S_{p2}$-2 of the second switch Sp2 are connected together at or form the first output node 111. The first output node 111 is configured to provide one phase 11 of the three-phase AC power signal.

The first terminal $S_{p3}$-1 of the third switch Sp2 is also connected to the first node 101. The first terminal $S_{p4}$-1 of the fourth switch Sp4 is also connected to the second node 102. The second terminal $S_{p3}$-2 of the third switch Sp3 and the second terminal $S_{p3}$-2 of the fourth switch Sp4 are connected together at or form the second output node 112. The second output node 112 is configured to provide another or a second phase 12 of the three-phase AC power signal.

The voltage divider circuit 30 shown in FIG. 2 includes a first capacitor C1 connected in series with a second capacitor C2. A first terminal $C_1$-1 of the first capacitor $C_1$ is configured to be connected to the first node 101 connected to the first DC voltage terminal (P). The first terminal $C_2$-1 of the second capacitor $C_2$ is configured to be connected to the second node 102 connected to the second DC voltage terminal (N). A second terminal $C_1$-2 of the first capacitor $C_1$ is configured to be connected to a second terminal $C_2$-2 of the second capacitor $C_2$. The second terminal $C_1$-2 of the first capacitor $C_1$ and the second terminal $C_2$-2 of the second capacitor $C_2$ are connected at or form the output node 113. The output node 113 provides the third phase 13 of the three-phase AC power signal and allows the switching circuit 100 to provide the half-bridge mode of operation.

Unlike the inverter bridge cells of the prior art where the common number of switches is six, the switching circuit 100 of the disclosed embodiments generates a three-phase AC power suitable for use in a resonant converter circuit using only four switches. This not only reduces cost and simplifies the circuit implementation, but the reduced number of active components and increases reliability and efficiency.

Figure 3:
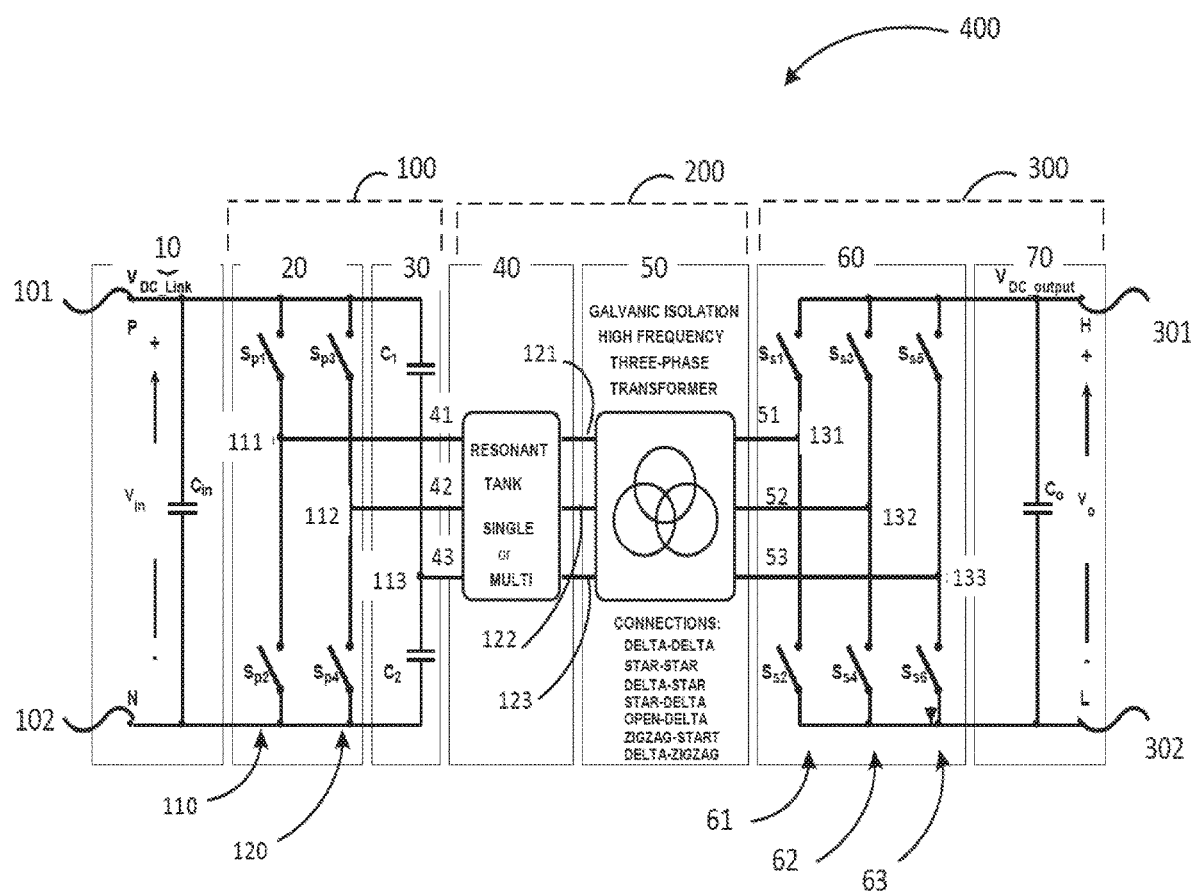
FIG. 3 illustrates a schematic diagram of an exemplary three-phase DC-DC resonant converter system incorporating aspects of the disclosed embodiments.

FIG. 3 illustrates an exemplary circuit topology for a three-phase DC-DC converter 400 including the four switch switching circuit 100. For purposes of the description herein, the DC-DC converter system 400 of FIG. 3 is divided into sections. In this example, the DC-DC converter system 400 includes a DC input circuit 10 and a DC output circuit 300, also referred to as a primary side and secondary side. The DC-DC converter 400 of FIG. 3 also includes the three phase inverter bridge cell or switching circuit 100 and a resonant converter circuit 200 between the DC input circuit 10 and the DC output 300. The DC output circuit 300 is configured to receive a three phase AC power and produce a DC output power $V_o$.

In the example of FIG. 3, the DC input circuit 10 of the converter system 400 generally includes a connector portion that provides the DC input power $V_{in}$ across positive (+) and negative (−) input rails or node 101, 102. The switching circuit 100 of the converter system 400 is configured to receive the DC input power yin across the positive (+) and negative (−) input rails 101, 102. An input capacitor $C_{in}$ is coupled across the input rails 101, 102 and provides filtering of the DC input power $V_{in}$. The switching circuit 100 is operated to produce the three phase power (11, 12, 13).

The resonant converter circuit 200 shown in FIG. 3 generally comprises a resonant tank block or circuit 40 followed by a transformer block or circuit 50. The resonant converter circuit 200 is configured to receive the three phase AC electric power from the switching circuit 100 on the three input nodes, generally shown as nodes 41, 42 and 43 in FIG. 3. In one embodiment the nodes 111, 112 and 113 of the switching circuit 100 are respectively connected to the nodes 41, 42 and 43 of the resonant converter circuit 200. Each node 41, 42, 43 is configured to receive a different one of the input phases or power signals 11, 12 and 13. As the term is used herein, three phase power as used herein refers to a type of electric power where three conductors, or phases, are used to carry an alternating current (AC), where each phase has the same frequency and voltage relative to a common reference and each phase is offset by 120 degrees from the other two phases. Generally, all phases in three phase electric power have symmetric waveforms, such as a sinusoid or square wave, such that at any given time two of the phases will offset the third phase The resonant tank circuit 40 can include a single or multi-resonant tank circuit in each phase. In the example of FIG. 4, the resonant tank circuit 40 includes three resonant devices, $RT_1$, $RT_2$ and $RT_3$, also referred to as resonant tank devices. The first resonant tank device $RT_1$ is connected between the node 111 and a node 121, second resonant tank device $RT_2$ is connected between the node 112 and a node 122 and third resonant tank device $RT_3$ is connected between the node 113 and a node 123. Each of the first, second and third resonant tank devices $RT_1$, $RT_2$, $RT_3$ generally comprise energy storage type electronic elements. The term "resonant device" as used herein generally refers to an electronic component configured to store electric energy, such as an inductor or a capacitor, or a combination thereof.

For example in one exemplary embodiment all three resonant tank devices $RT_1$, $RT_2$, $RT_3$ are capacitors. Alternatively, all three resonant tank devices $RT_1$, $RT_2$, $RT_3$ may be inductors. The resonant tank devices $RT_1$, $RT_2$, $RT_3$ can also be a combination of capacitors and inductors.

FIG. 4 illustrates exemplary embodiments of the resonant tank devices $RT_1$, $RT_2$, and $RT_3$. In this example, the resonant tank devices are LC type resonant tank devices or circuits. The inductors $L_{ra}$, $L_{rb}$ and $L_{rc}$ are the resonant inductors that can be constructed with independent cores or integrated into one single core. This can simplify the construction and layout of the converter. The capacitors $C_{ra}$, $C_{rb}$ and $C_{rc}$ are the resonant capacitors. Although the aspects of the disclosed embodiments are generally described herein with respect to LC type resonant tank circuits, the aspects of the disclosed embodiments are not so limited. In alternate embodiments, the resonant tank circuit 40 can include any suitable resonant tank circuits, such as an LLC type. In one embodiment, the capacitors C1 and C2 of the voltage divider circuit 30 can form the resonant capacitor $C_{rc}$. By using the capacitors C1 and C2 of the voltage divider circuit as the resonant capacitor $C_{rc}$ the number of capacitors in the system 400 is reduced.

In the example of FIGS. 4-5, the transformer circuit 50 includes three transformers or transformer windings, $T_1$, $T_2$ and $T_3$. The transformer circuit 50 is a three-phase high frequency transformer that is configured to provide galvanic isolation between the input and the output. In one embodiment, the transformers $T_1$-$T_3$ are high frequency isolation transformers with a turns ratio of n:1. The transformers $T_1$-$T_3$ can be single core transformers or integrated into one single core. $L_{m1}$-$L_{m3}$ are the magnetizing inductances for the transformers $T_1$-$T_3$, respectively.

The connections between the resonant tank circuit 40 and the transformer circuit 50 can be configured in any suitable type of connection, including for example delta-delta, wye-wye, star-star, delta-star, star delta, open delta, zigzag start-delta and delta-zigzag type connections.

FIG. 4 illustrates an exemplary delta-delta (Δ-Δ) type connection of the transformer circuit 50 and the resonant tank circuit 40. In this example, a first terminal of transformer $T_1$ is connected to the first resonant tank device $RT_1$. A second terminal of transformer $T_1$ is connected to the second resonant tank device $RT_2$ and the second transformer $T_2$. The second terminal of the second transformer $T_2$ is connected to the third resonant tank device $RT_3$ and a first terminal of the third transformer $T_3$. The second terminal of the third transformer $T_3$ is connected to the first resonant tank device $RT_1$ and the first terminal of the first transformer $T_1$.

FIG. 5 illustrates an exemplary wye-wye (Y-Y) type connection of the transformer circuit 50 and the resonant tank circuit 40. In this example, a first terminal of the first transformer $T_1$ is connected to the first resonant tank device $RT_1$. The second terminal of the first transformer $T_1$ is connected to a second terminal of the second transformer $T_2$ and the third transformer $T_3$. The first terminal of the second transformer $T_1$ is connected to the second resonant tank device $RT_2$ and the first terminal of the third transformer $T_3$ is connected to the third resonant tank device $RT_3$.

Referring to FIGS. 1 and 3, the resonant converter circuit 200 is followed by the DC output circuit 300. The DC output circuit 300 generally comprises a three-phase rectifying bridge cell 60, also referred to as a three phase rectifier circuit, followed by an output filter capacitor circuit 70. The three-phase rectifying bridge cell 60 is connected to the outputs 51, 52 and 53 of the transformer circuit 50 at nodes 131, 132 and 133, respectively. The three phase rectifying bridge cell 60 is configured to receive a three phase AC power from the transformer circuit 50 and produce a DC output power $V_O$. The exemplary rectifier circuit 60 of FIG. 4 receives the three phase AC power at the three rectifier circuit input nodes 131, 132, 133 from the transformer circuit 50.

The output circuit 300 includes a positive (+) output rail 301 and a negative (−) output rail 302 for the DC output power $V_O$. The output filter capacitor circuit 70 includes an output filter capacitor $C_o$ coupled across the positive (+) and negative (−) output rails 301, 302 and is configured to filter noise and reduce ripple from the output power $V_O$.

In the example of FIG. 3, the three-phase rectifying bridge cell 60 includes three half bridge circuits 61, 62, and 63 coupled in parallel across the output rails 301, 302. In the example of FIG. 3, the three half-bridge circuits 61, 62 and 63 comprise pairs of series connected switches $S_{s1}$, $S_{s2}$, $S_{s3}$, $S_{s4}$, $S_{s5}$ and $S_{s6}$. Nodes 131, 132 and 133 are connected between the respective pairs of switches $S_{s1}$, $S_{s2}$, $S_{s3}$, $S_{s4}$, $S_{s5}$ and $S_{s6}$.

As was described with respect to the switches of the switching circuit 100, the switches $S_{s1}$, $S_{s2}$, $S_{s3}$, $S_{s4}$, $S_{s5}$ and $S_{s6}$ can generally comprise any suitable type of synchronous rectification switching devices or transistors, including for example, MOSFETs, IGBTs, GaN-HEMTs and MCTs, devices constructed from a variety of materials including silicon (Si), silicon-carbide (SiC), gallium nitride (GaN) as well as other semiconductor materials, or a combination thereof. FIGS. 4 and 5 illustrate examples of the use of wide band gap GaN transistors for switches $S_{s1}$, $S_{s2}$, $S_{s3}$, $S_{s4}$, $S_{s5}$ and $S_{s6}$. If synchronous rectification (SR) is not implemented, the switches can comprise diodes.

FIG. 6 illustrates the voltage gain characteristics for different quality factors of a three-phase DC-DC resonant converter system 400 incorporating aspects of the disclosed embodiments. The DC output voltage $V_O$ is presented along the Y-axis while the frequency f (kHz) is presented along the X-axis. As is illustrated in the graphs, the natural resonance frequency $f_{res}$ is similar to the LLC resonant converter.

The aspects of the disclosed embodiments reduce the number of switches in the inverter bridge cell of a three-phase DC-DC resonant converter system 400. This reduces the number of components and the complexity of the topological circuit, which reduces costs. Costs are also reduced when wide band gap semiconductor technologies are implemented for the switches. Reducing the number of switches also reduces the number of capacitors needed for the input and output filters, which also reduces volume, weight and cost.

With fewer switches, the number of winding turns in the transformer that are required can also be reduced and any connection type of three-phase transformer can be implemented. Storage elements are not required to achieve zero voltage switching in the primary side and zero current switching in the secondary side. The aspects of the disclosed embodiments enable wide input and output voltage variation due to the voltage gain characteristics of the resonant converter. The voltage gain characteristic is greater than 1, which makes boost and buck modes of operation possible. The circuits of the disclosed embodiments can also be extended for any number of converters and used with different connection types (series/parallel) of three phase resonant converters, either stand-alone or in series/parallel connection among them. The aspects of the disclosed embodiments can also be used in multi-level type converters for high voltage applications.

Thus, while there have been shown, described and pointed out, fundamental novel features of the application as applied to the exemplary embodiments thereof, it will be understood that various omissions, substitutions and changes in the form and details of devices and methods illustrated, and in their operation, may be made by those skilled in the art without departing from the spirit and scope of the presently disclosed application. Further, it is expressly intended that all combinations of those elements, which perform substantially the same function in substantially the same way to achieve the same results, are within the scope of the application. Moreover, it should be recognized that structures and/or elements shown and/or described in connection with any disclosed form or embodiment of the application may be incorporated in any other disclosed or described or suggested form or embodiment as a general matter of design choice. It is the intention, therefore, to be limited only as indicated by the scope of the claims appended hereto.

What is claimed is:

1. A switching circuit for a DC-DC three-phase resonant converter system, the switching circuit comprising:
a plurality of switches consisting of four switches, the four switches arranged in: a first pair of series connected switches, and a second pair of series connected switches;
a first half-bridge circuit consisting of: the first pair of series connected switches, and a first output node positioned in between a first switch and a second switch of the first pair of series connected switches, the first half-bridge circuit configured to provide a first power signal to the first output node and further to a first terminal of an inductance or a capacitance of a first branch of a resonant tank circuit of the DC-DC three-phase resonant converter system;
a second half-bridge circuit consisting of: the second pair of series connected switches, and a second output node positioned in between a third switch and a fourth switch of the second pair of series connected switches, the second half-bridge circuit configured to provide a second power signal to the second output node and further to a first terminal of an inductance or a capacitance of a second branch of the resonant tank circuit; and
a voltage divider circuit connected in parallel with: the first half-bridge circuit, the second half-bridge circuit, and a DC input power, the voltage divider circuit including a third output node, the voltage divider circuit configured to provide a third power signal to the third output node and further to a first terminal of an inductance or a capacitance of a third branch of the resonant tank circuit, the voltage divider circuit consisting of: a first capacitor connected in series with a second capacitor, and a third output node positioned between the first and second capacitors, wherein each of the first and second capacitors is not connected in parallel with a switch, the third output node is connected to the DC input power only through the first capacitor or the second capacitor,
wherein a switch control signal provided to each of the first and second pairs of switches produces the first, second, and third power signals to thereby induce a three-phase AC power at the first, second, and third output nodes for driving the DC-DC three-phase resonant converter system,
wherein a switching pattern of each of the first pair of series connected switches and the second pair of series connected switches is phase shifted to provide a first and a second phase of the three-phase AC power,
wherein the third output node provides a third phase of the three-phase AC power, and wherein the first and second capacitors in the voltage divider circuit always receive power directly from the DC input power independent of the switching pattern of each of the first pair of series connected switches and the second pair of series connected switches.

2. The switching circuit according to claim 1, wherein the phase shift is 60 degrees.

3. The switching circuit according to claim 1, wherein the phase shift is in the range of 50 to 70 degrees.

4. The switching circuit according to claim 1, wherein a first node is configured to be connected to a first DC voltage terminal of the DC input power, and a second node is configured to be connected to a second DC voltage terminal of the DC input power, the first node connecting the DC input power to a first side of the first half bridge circuit, the second half bridge circuit and the voltage divider circuit, the second node connecting the DC input power to a second side of the first half bridge circuit, the second half bridge circuit and the voltage divider circuit.

5. The switching circuit according to claim 4, wherein a first terminal of the first switch is connected to the first node connected to the first DC voltage terminal, a first terminal of the second switch is connected to the second node connected to the second DC voltage terminal, and a second terminal of the first switch is connected to a second terminal of the second switch.

6. The switching circuit according to claim 5, wherein the first switch and the second switch in the first half-bridge circuit, and the third switch, and the fourth switch in the second half-bridge circuit, comprise gallium-nitride (GaN) transistors.

7. The switching circuit according to claim 4, wherein a first terminal of the third switch is connected to the first node connected to the first DC voltage terminal, a first terminal of the fourth switch is connected to the second node connected to the second DC voltage terminal, and a second terminal of the third switch is connected to a second terminal of the fourth switch.

8. The switching circuit according to claim 1, wherein a first terminal of the first capacitor is configured to be connected to a first node connected to the first DC voltage terminal, a first terminal of the second capacitor is configured to be connected to a second node connected to the second DC voltage terminal, and a second terminal of the first capacitor is configured to be connected to a second terminal of the second capacitor.

9. The switching circuit according to claim 1, wherein the first output node is configured to be connected to a first input phase of the resonant tank circuit to provide the first power signal; the second output node is configured to be connected to a second input phase of the resonant tank circuit to provide the second power signal; and the third output node is configured to be connected to a third input phase of the resonant tank circuit to provide the third power signal.

10. The switching circuit according to claim 1, further comprising an input capacitor connected in parallel with the first half-bridge circuit, the second half-bridge circuit, the voltage divider circuit, and the DC input power.

11. A DC-DC three-phase resonant converter system comprising:
a DC voltage input circuit providing a DC input power;
a switching circuit connected to the DC voltage input circuit;
a resonant converter circuit connected to an output of the switching circuit, the resonant converter circuit comprising a resonant tank circuit, wherein the switching circuit comprises:

a plurality of switches consisting of four switches, the four switches arranged in: a first pair of series connected switches, and a second pair of series connected switches;

a first half-bridge circuit consisting of: the first pair of series connected switches, and a first output node positioned in between a first switch and a second switch of the first pair of series connected switches, the first half-bridge circuit configured to provide a first power signal to the first output node and further to a first terminal of an inductance or a capacitance of a first branch of the resonant tank circuit;

a second half-bridge circuit consisting of: the second pair of series connected switches, and a second output node positioned in between a third switch and a fourth switch of the second pair of series connected switches, the second half-bridge circuit configured to provide a second power signal to the second output node and further to a first terminal of an inductance or a capacitance of a second branch of the resonant tank circuit; and a voltage divider circuit connected in parallel with: the first half-bridge circuit, the second half-bridge circuit, and the DC input power, the voltage divider circuit including a third output node, the voltage divider circuit configured to provide a third power signal to the third output node and further to a first terminal of an inductance or a capacitance of a third branch of the resonant tank circuit, the voltage divider circuit consisting of a first capacitor connected in series with a second capacitor, and a third output node positioned between the first and second capacitors, wherein each of the first and second capacitors is not connected in parallel with a switch, the third output node is connected to the DC input power only through the first capacitor or the second capacitor; and a DC voltage output circuit connected to an output of the resonant converter circuit, wherein a switch control signal provided to each of the first and second pairs of switches produces the first, second, and third power signals to thereby induce a three-phase AC power at the first, second, and third output nodes for driving the resonant converter circuit, wherein a switching pattern of each of the first pair of series connected switches and the second pair of series connected switches is phase shifted to provide a first and a second phase of the three-phase AC power, wherein the third output node provides a third phase of the three-phase AC power, and wherein the first and second capacitors in the voltage divider circuit always receive power directly from the DC input power independent of the switching pattern of each of the first pair of series connected switches and the second pair of series connected switches.

12. The DC-DC three-phase resonant converter system according to claim 11, wherein the resonant converter circuit is a three-phase resonant converter circuit; and wherein the first phase is provided by the first output node of the switching circuit to the resonant converter circuit, the second phase is provided by the second output node of the switching circuit to the resonant converter circuit, and the third phase is provided by the third output node of the switching circuit to the resonant converter circuit.

13. The DC-DC three-phase resonant converter system according to claim 11, wherein the resonant converter circuit comprises a transformer circuit connected to an output of the resonant tank circuit.

14. The DC-DC three-phase resonant converter system according to claim 13, wherein the DC voltage output circuit is connected to an output of the transformer circuit and comprises a three-phase rectifying bridge cell and an output filter.

15. A switching circuit for a DC-DC three-phase resonant converter system, the switching circuit comprising:

a plurality of switches consisting of four switches, the four switches arranged in: a first pair of series connected switches, and a second pair of series connected switches, wherein the first pair of series connected switches consists of: a first switch connected in series with a second switch, and a first output node positioned therebetween, wherein the second pair of series connected switches consists of: a third switch connected in series with a fourth switch, and a second output node positioned therebetween, wherein the first pair of series connected switches is configured to provide a first power signal to the first output node and further to a first terminal of an inductance or capacitance of a first branch of a resonant tank circuit of the DC-DC three-phase resonant converter system, and wherein the second pair of series connected switches is configured to provide a second power signal to the second output node and further to a first terminal of an inductance or capacitance of a second branch of a resonant tank circuit;

a pair of series connected capacitors connected in parallel with: a DC input power, the first pair of series connected switches, and the second pair of series connected switches, the pair of series connected capacitors consisting of: first capacitor connected in series with a second capacitor, and a third output node positioned between the first and second capacitors, wherein each of the first and second capacitors is not connected in parallel with a switch, the third output node is connected to the DC input power only through the first capacitor or the second capacitor, and the pair of series connected capacitors is configured to provide a third power signal to the third output node and further to a first terminal of an inductance or a capacitance of a third branch of the resonant tank circuit; and a controller for providing a switch control signal to the first, second, third and fourth switches, wherein:
the switch control signal provided by the controller to the first, second, third, and fourth switches produces the first, second, and third power signals to thereby cause a three-phase AC power to be induced at the first, second, and third output nodes;
a switching pattern of the first, second, third, and fourth switches is phase shifted to provide a first and a second phase of the three-phase AC power;
the third output node provides a third phase of the three-phase AC power; and
the pair of series connected capacitors always receive power directly from the DC input power independent of the switching pattern of the first, second, third, and fourth switches.

* * * * *